United States Patent [19]

Christensen et al.

[11] Patent Number: 5,349,583
[45] Date of Patent: Sep. 20, 1994

[54] MULTI-CHANNEL TOKEN RING

[75] Inventors: Kenneth J. Christensen, Apex; Francis E. Noel, Jr., Durham, both of N.C.

[73] Assignee: International Business Machines Corporation, Armonk, N.Y.

[21] Appl. No.: 746,677

[22] Filed: Aug. 16, 1991

[51] Int. Cl.$^5$ .............................................. H04J 3/02
[52] U.S. Cl. ........................... 370/85.5; 370/85.7; 370/85.12; 370/85.14; 370/85.15; 370/825.06
[58] Field of Search ............... 370/85.9, 88.5, 85.12, 370/85.14, 85.15, 85.7; 340/825.06

[56] References Cited

U.S. PATENT DOCUMENTS

| | | | |
|---|---|---|---|
| 4,416,008 | 11/1983 | Takahashi et al. | 370/85.12 |
| 4,539,679 | 9/1985 | Bux et al. | 370/85.14 X |
| 4,602,365 | 7/1986 | White et al. | 370/85.5 |
| 4,821,174 | 4/1989 | Webb et al. | 370/85.12 X |
| 5,107,490 | 4/1992 | Wilson et al. | 370/85.5 X |

Primary Examiner—Douglas W. Olms
Assistant Examiner—Russell W. Blum
Attorney, Agent, or Firm—John J. Timar

[57] ABSTRACT

A system for utilizing a transmission media such as a token ring having multiple, independent channels operating in parallel. The invention provides optimal use of multi-channel bandwidth to a plurality of interconnected workstations, file servers, and other devices. The workstations and devices attach to the token ring via dedicated lobe rings connected to concentrators on the token ring. Each concentrator contains the processors, memory, and logic necessary to coordinate the transmission and receipt of data over the token ring among the interconnected workstations and devices. The multi-channel token ring provides increased bandwidth and reliability to an existing token ring without requiring modifications to existing physical devices, interfaces, or protocols.

9 Claims, 10 Drawing Sheets

| DESTINATION ADDRESS | SOURCE ADDRESS | |
|---|---|---|
| BBBB | AAAA | INFORMATION |

FIG. 5

| HEADER | BBBB | AAAA | INFORMATION | TRAILER |
|---|---|---|---|---|

FIG. 6

| XXXX | AAAA | BBBB | AAAA | INFORMATION |
|---|---|---|---|---|

MULTI-CHANNEL TOKEN RING

FIELD OF THE INVENTION

This invention relates to digital communications systems including local area networks, and in particular, to a token ring system comprising multiple, independent backbone channels, that provides connected workstations and devices with optimal bandwidth, without requiring changes to higher-layer protocols or physical interfaces, while conforming to existing communications standards.

BACKGROUND OF THE INVENTION

A local area network (LAN) is characterized by its high data transmission rate, and the fact that, in general, the communication channel of the network is shared by all the workstations and devices connected to that particular network. There are a variety of techniques for enabling devices connected to a network to communicate with each other. One such technique is the use of a token ring, whereby a "token" is continuously circulated among the connected devices; messages and data to be transmitted from one device to another are appended to the token. The performance of a token ring is measured by the speed at which data is transmitted on the ring; standard token ring data rates are 4 Mbps (megabits per second) and 16 Mbps.

Users of token ring systems face the problem of how to increase performance without replacing their existing systems. The present invention describes a solution to that problem: namely, by adding a plurality of independent token rings or channels, operating in parallel and at the same data rate as the existing ring, in order to increase the capacity, or bandwidth, of the system. The technique described in this invention can be implemented without changing existing interfaces or protocols, and conforms with IEEE communications standards.

Among the related prior art to local area network systems, U.S. Pat. No. 4,766,590 describes a scheme for connecting a plurality of stations to form a single serial transmission loop, so as to vary the order of connections of the stations of the loop. The patent fails to address the subject of multiple backbone channels or techniques to utilize the capacity of multiple channels; the use of multiple channels is an integral part of the present invention.

The subject matter of U.S. Pat. No. 4,468,733 is a scheme for building a serial bus loop system consisting of multiple serial bus loops, in order to increase the reliability of a single bus loop system. The patent involves a flat network with one channel of communication for multiple devices, unlike the present invention which utilizes multiple channels of communication for multiple devices.

A third related patent is U.S. Pat. No. 3,748,647, which describes a scheme for interconnecting a plurality of shift registers into a plurality of rings, each ring consisting only of shift registers and logic related to controlling shift registers. The patent addresses only information contained in fixed length registers, not in variable length frames which are used by local area networks. The patent significantly differs from the present invention in that it fails to address local area networks, conformance to network standards, or the optimal and reliable use of available bandwidth.

SUMMARY OF THE INVENTION

In view of the shortcomings of the prior art, it is a primary object of this invention to provide interconnected workstations and other devices with optimal use of multi-channel bandwidth. Optimal use results from always using the first available token on any channel.

Another object is to increase the usable bandwidth by as much as n-times over a conventional single channel local area network, where "n" represents the number of independent backbone channels in a multi-channel token ring. By increasing the bandwidth, there is no need to increase the speed or bit rate of an existing network.

An additional object of this invention is to provide greater reliability than a single channel network, due to the ability to communicate over other channels if one is malfunctioning.

Yet another object is to add the increased bandwidth and reliability without any changes to existing physical interfaces, media access control, or logical link control. Network management functions may be added that are essentially transparent to the application and protocol layers of a workstation.

Finally, the invention conforms with IEEE 802.5 communication standards.

Other objects and advantages of the present invention will be set forth in part in the description and the drawings which follow and, in part, will be obvious from the description or may be learned by practice of the invention.

To achieve the foregoing objects, and in accordance with the purpose of the invention as broadly described herein, a communications system is provided comprising a transmission media having multiple channels, at least one access unit which interfaces with the individual channels of the transmission media, at least one device associated with each of the access units, each device employing its associated access unit to receive data from and transmit data to the transmission media, and means for sending data between the devices and the access units. Preferably, the transmission media is a token ring having multiple channels operating in parallel. Further, the sending means preferably comprises at least one lobe, each lobe providing communications between one of the access units and at least one device associated with the access unit, wherein each access unit includes at least one first physical interface, each interfacing with and corresponding to each lobe associated with the access unit, and second physical interfaces, one corresponding to and interfacing with each channel of the transmission media with which the access unit interfaces. Each access unit also includes means for controlling access to the first physical interfaces, receipt of data from and transmission of data to the channels of the transmission media, and access to the second physical interfaces.

Each device preferably includes means for transferring data to and from its associated access unit via the lobe ring associated therewith. This transferring means includes a physical interface with the lobe ring and means for controlling access to its physical interface, receipt of data from the lobe ring and transmission of data to the lobe ring, and receipt of data by the device and transmission of data from the device.

The controlling means of the transferring means communicates with the controlling means of its associated access unit to effect control of data transmission between the device and its access unit. The controlling means of the access unit also may include memory which includes cache memory for storing control data and buffers for temporarily storing data received by the access unit from the transmission media and from the device. The control means of the access unit and the control means of the device further cooperate so that if the buffer for receiving data from the device is full, the control means of the device will not send additional data to the control means of the access unit. Each access unit of the communications system preferably sends data frames received from their associated devices over the first available channel of the transmission media.

The present invention also provides for an adapter which connects a device to a transmission media having multiple channels. The adapter comprises means for interfacing with individual channels of the transmission media, means for receiving data from and transmitting data to the device, and means for controlling the interfacing means and the receiving and transmitting means so that a data frame from the device is transmitted on the transmission media over the first available channel. Preferably, the controlling means further comprises means for storing control data, means for temporarily storing data received from the device and means for temporarily storing data received from the transmission media, with the controlling means functioning to not permit data to be sent from the device for transmission over the transmission media when the temporary device data storage means is full. Further, after the controlling means receives a data frame from the device, the controlling means causes the data frame to be transmitted over the transmission media over the first available channel. Further, the transmission media is preferably a token ring having multiple channels.

The present invention will now be described with reference to the following drawings, in which like reference numbers denote the same elements throughout.

DESCRIPTION OF THE PREFERRED EMBODIMENT

Figure 1:
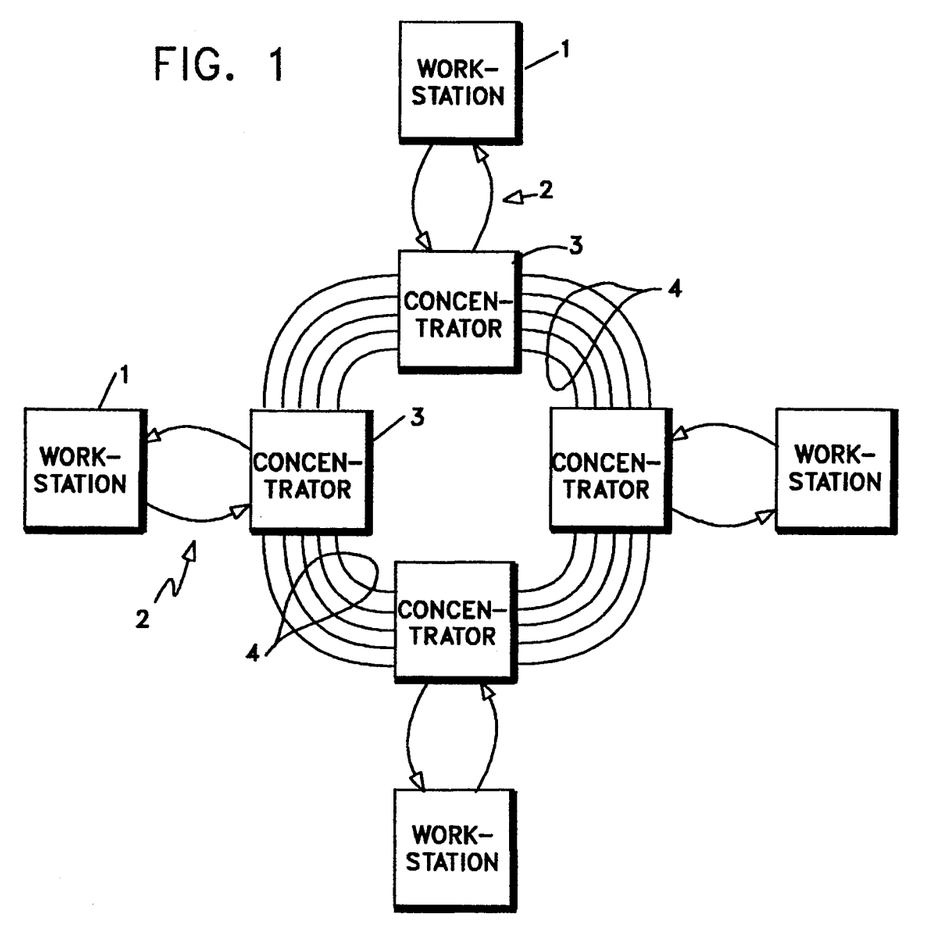
FIG. 1 is a diagram illustrating one embodiment of a multi-channel token ring according to the present invention.

An embodiment of the invention as applied to a token ring (IEEE 802.5 or FDDI) is illustrated in FIG. 1. This invention may also be applied to Ethernet implementations.

Figure 1A:
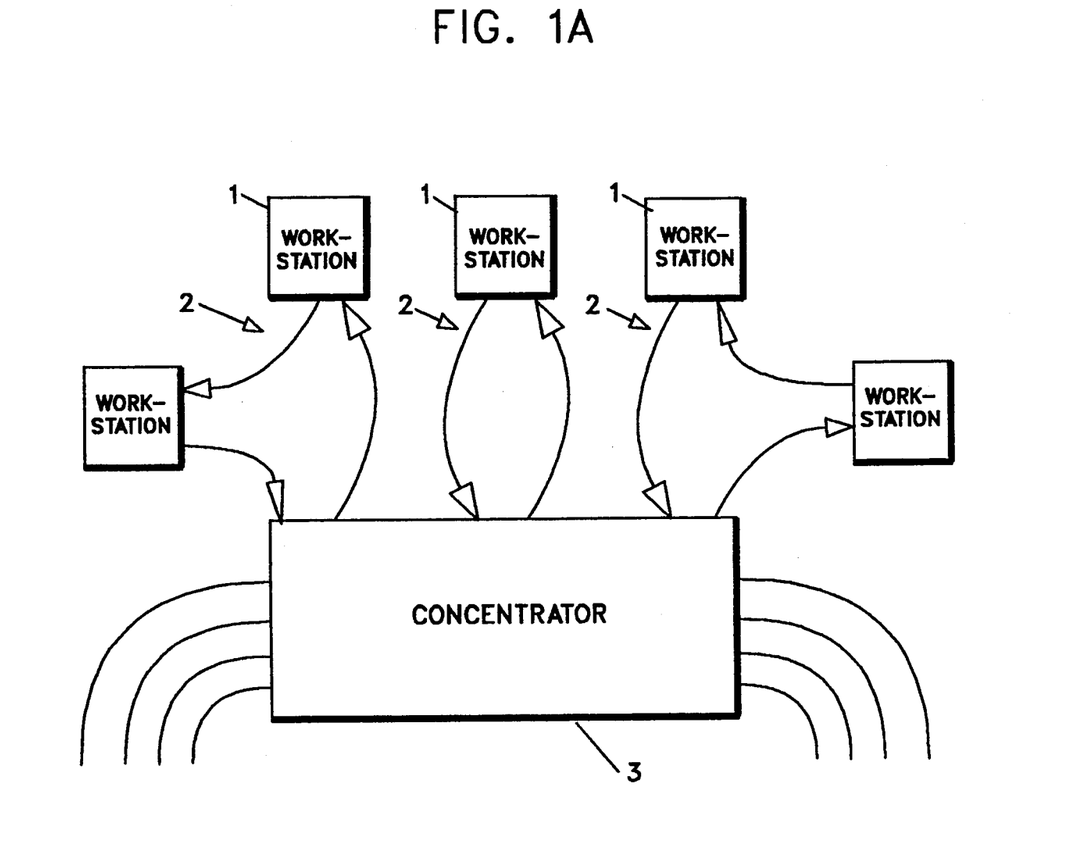
FIG. 1A is a diagram illustrating a portion of the embodiment of FIG. 1 showing a concentrator connected to multiple lobe rings, each with one or more attached workstations.

A workstation 1 is connected to a concentrator or access unit 3 via a communication channel such as a lobe ring 2. Workstation 1 can be another device such as a file server, a print server, or some other peripheral, but will be labeled "workstation" for purposes of this description. Each lobe ring 2 operates as a token ring dedicated to communication with a concentrator 3. Each concentrator or access unit 3 is connected to one or more lobe rings 2, and one or more workstations 1 will be attached to each lobe ring 2. For discussion purposes, this specification refers to a concentrator connected to only one lobe ring with one attached workstation; FIG. 1A illustrates a probable implementation comprising a concentrator 3 connected to multiple lobe rings 2, each with one or more attached workstations 1. Returning to FIG. 1, the concentrator 3 is attached to a multi-channel transmission media 4 which permits communication between concentrator 3 and thus workstations 1 associated with different concentrators. The transmission media is preferably a multi-channel token ring 4 having n independent channels. The independent channels can be individual fiber or copper cables; alternatively, where wavelength division multiplexing technology is available, this invention can utilize multiple channels (wavelengths) within the same medium (fiber). Multiple workstation-concentrator pairs inhabit the multi-channel token ring 4.

Figure 2:
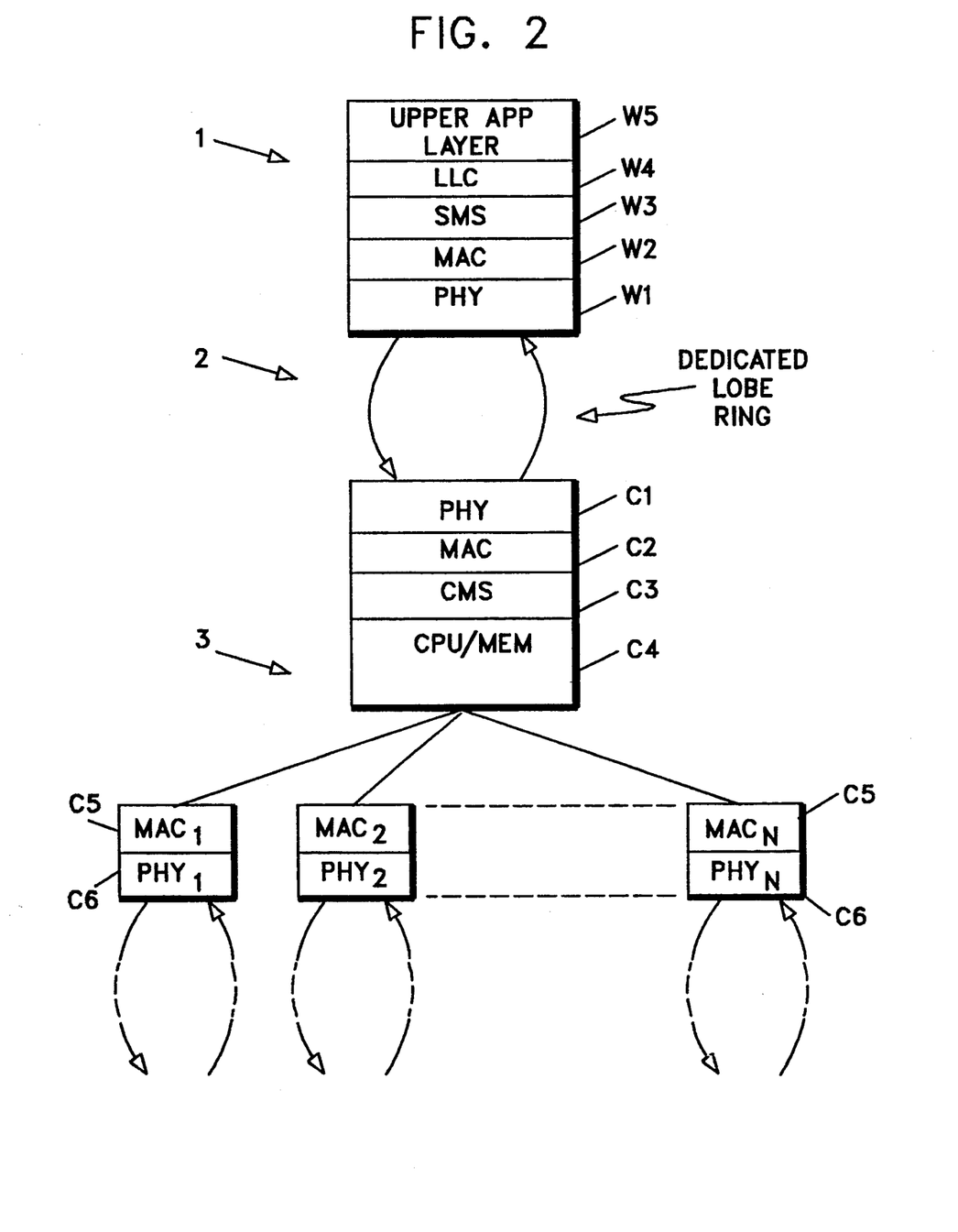
FIG. 2 is a diagram illustrating the functional layers of a workstation-concentrator pair connected via a lobe ring.

FIG. 2 illustrates the functional layers of a workstation-concentrator pair. In the workstation 1, an upper layer W5 includes applications, user interfaces, and system software. Layer W4 is the logical link control layer or LLC. The LLC employs communications protocol defined by IEEE 802.2, and serves to organize and control the flow of data to and from the workstation 1, as well as perform error control and recovery. The next layer, W3, is the station media access control supervisor or SMS. The SMS, which is introduced by this invention, provides an interface between the LLC (layer W4) and the station media access control or MAC (layer W2). This interface duplicates the MAC interface, so that the LLC and upper layer W5 require no changes in order to implement this invention. The SMS of layer W3 also employs a protocol whereby it responds to signals from the concentrator MAC supervisor or CMS (to be discussed below with respect to layer C2) to stop transmission of data in order to prevent overflow of concentrator memory buffers.

Continuing with the functional layers of the workstation 1, layer W2 comprises the aforementioned MAC. The MAC layer is defined by IEEE 802.5, and controls access to the underlying physical medium layer W1. The MAC also appends a standard header and trailer to outgoing data, removes the header and trailer from incoming data, and performs error checking. Layer W1 is the physical interface that connects the workstation 1 to the lobe ring 2. Both layer W1 and lobe ring 2 conform to IEEE 802.5.

The functional layer of the concentrator or access unit 3 that interfaces with lobe ring 2 is physical medium layer C1. Layer C1 corresponds to workstation layer W1. The next layer, C2, comprises the concentrator lobe MAC. This MAC controls access to physical interface layer C1, appends the standard IEEE 802.5 header and trailer to incoming data being transmitted to lobe ring 2, and removes the header and trailer from outgoing data from the workstation 1. Layer C3 comprises the concentrator MAC supervisor or CMS, which is introduced by this invention. The CMS controls a 1-to-n interface by transmitting data frames sent from the workstation 1 onto the n channels forming the multi-channel token ring 4. Conversely, the CMS controls an n-to-1 interface by receiving data frames sent via any of the n channels to the workstation 1. The CMS also monitors outbound memory buffers in the concentrator 3 and notifies the SMS (layer W3) in the workstation 1 to stop transmitting data when the buffers are full.

A functional layer C4 comprises internal processing and memory in the concentrator 3. Two CPUs manage memory and coordinate the transmission of data frames. The memory includes inbound and outbound buffers for the temporary storage of data frames during transmission, and cache memory for use by the CPUs in coordinating data transmission.

Layer C5 is the concentrator ring MAC layer. This layer comprises multiple MACs, with one MAC corresponding to each of the n channels on the multi-channel token ring 4. Each of the MACs in layer C5 controls access to an associated physical device in physical medium layer C6. The channel MACs encapsulate data being transmitted to the channels with the standard IEEE 802.5 header and trailer. The physical devices in layer C6 also conform to IEEE 802.5, and provide the physical connection for the concentrator 3 to the independent channels of the multi-channel token ring 4.

Figure 3:
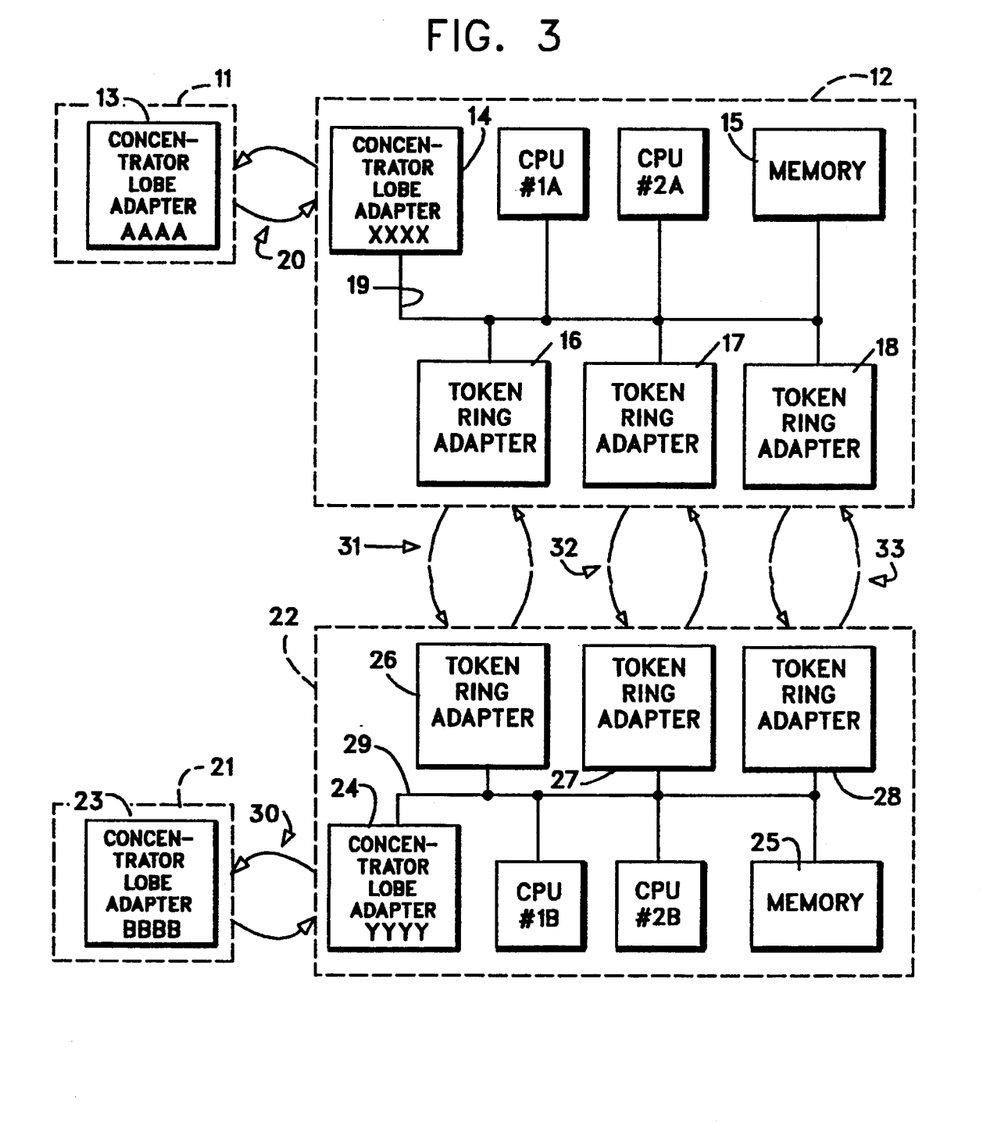
FIG. 3 is a block diagram illustrating the components of two workstation-concentrator pairs that inhabit a multi-channel token ring.

In FIG. 3, two workstation-concentrator pairs that inhabit the same multi-channel token ring are illustrated. Workstation 11 and concentrator 12 are linked by lobe ring 20; workstation 21 and concentrator 22 are linked by lobe ring 30. Both of these pairs are connected to a multi-channel token ring that, in this embodiment, comprises three independent token ring channels 31, 32, 33. While only two concentrators (12 & 22) are shown, a plurality of devices could be connected to the multi-channel token ring.

Workstation 11 includes a concentrator lobe adapter 13 with address 'AAAA'. This adapter 13 provides the media access control (MAC) function and physical connection to the lobe ring 20, as described in workstation layers W2 and W1 in FIG. 2. Workstation 21 contains a corresponding concentrator lobe adapter 23 with address 'BBBB'.

Concentrator or access unit 12 is illustrated as possessing a total of four substantially identical adapters. A single concentrator lobe adapter 14 having address 'XXXX' is shown, although typically a concentrator will include one such lobe adapter for each concentrator lobe associated therewith. This adapter 14 provides MAC function and physical connection to the lobe ring 20, as described in concentrator layers C2 and C1 in FIG. 2 (in concentrator or access unit 22, see adapter 24, which has address 'YYYY'). The other three adapters shown in the concentrator 12 are token ring adapters 16, 17, which are connected, respectively, to each of the three independent token ring channels 31, 32, 33 of the token ring. A typical concentrator will include one such token ring adapter connected to each channel of the multi-channel token ring with which the concentrator interfaces. Each of these adapters 16, 17, 18 recognizes address 'AAAA' in frames being transmitted over its associated channel of the token ring, and provides MAC function and a physical interface to the independent token ring channels 31, 32, 33, as described in concentrator layers C5 and C6 in FIG. 2 (in concentrator 22, see token ring adapters 26, 27, 28, each recognizing address 'BBBB').

Within concentrator or access unit 12, there is a memory component that includes cache memory, as well as inbound buffers and outbound buffers for the temporary storage of data frames during communication (in concentrator or access unit 22, see memory component 25). The outbound buffers are used to hold data frames sent from workstation 11 for transmission to other workstations or devices on the multi-channel token ring. There is a separate inbound buffer in memory 15 associated with each of the token ring adapters 16, 17, 18, in which data frames received from workstations or devices on the token ring are held until they can be processed for transmission to the associated workstation 11. The memory 15 is managed by CPUs 1A and 2A (in concentrator 22, see CPUs 1B and 2B). CPU 1A manages the outbound buffers, while CPU 2A manages the inbound buffers. CPU 1A controls the protocol between the previously-discussed station media access control supervisor or SMS (layer W3 in FIG. 2) and concentrator media access control supervisor or CMS (layer C3 in FIG. 2), as well as the frame encapsulation protocol. The CPUs 1A 2A, in combination, perform traffic control for a shared data bus 19 in concentrator 12 (in concentrator 22, see data bus 29). The CPUs coordinate the transmission of queued data frames from their associated workstation to the channel on the multi-channel token ring having the next available token. They also coordinate the receipt of data frames by their associated workstation via the inbound buffers of the memory 15. This coordination is facilitated by maintaining an ordered list in the cache memory portion of memory 15 of the buffer locations of data frames to be transmitted or received.

Figure 4:
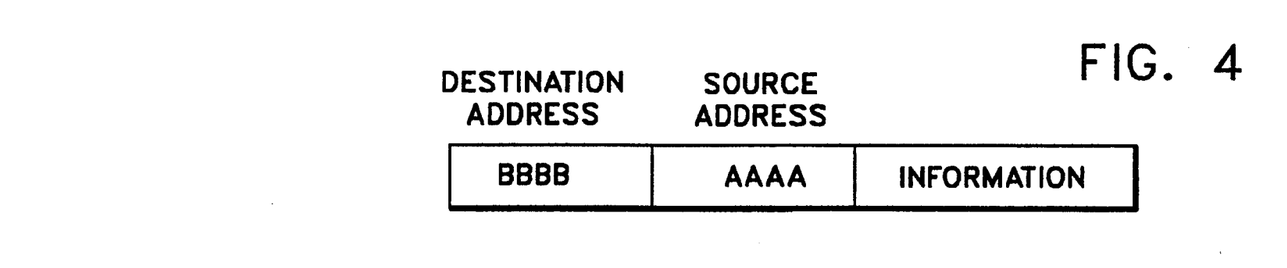
FIGS. 4 and 5 are representations of the fields of a token ring frame as used in the preferred embodiment of this invention.

When information at a workstation is to be transmitted to another workstation on the multi-channel token ring or transmission media the logical link control or LLC (layer W4 in FIG. 2) sets up a frame containing the information to be transmitted, the source or "from" address, and the destination or "to" address. FIG. 4 illustrates how this frame would appear when information from workstation 11, with an adapter address of 'AAAA' is to be transmitted to workstation 21, with an adapter address of 'BBBB'.

Figure 5:
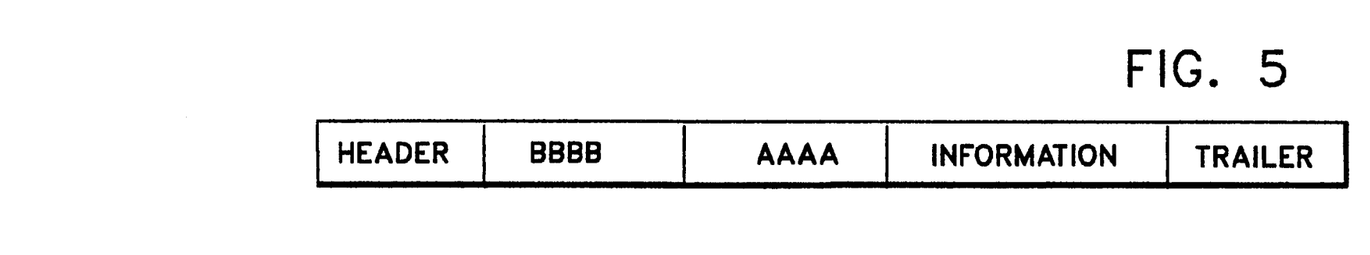

Next, the workstation MAC (layer W2 in FIG. 2) encapsulates the frame with a standard IEEE 802.5 header and trailer, as shown in FIG. 5. When a token is available on the lobe ring 20, the entire frame is transmitted onto the lobe ring 20. Concentrator lobe adapter 14 in concentrator 12 recognizes that this frame is not from concentrator 12 (i.e., source address is not 'XXXX'), and after the concentrator lobe MAC (layer C2 in FIG. 2) removes the header and trailer, the frame is copied into the memory 15. Before transmission from the workstation 11 and to the concentrator 12 can occur, the CMS (layer C3 in FIG. 2) checks to see if the outbound buffers in memory 15 are full; no transmission will occur if the CMS notifies the SMS (layer W3 in FIG. 2) that the outbound buffers are full.

When the frame is received by the concentrator lobe adapter 14, the CMS (layer C3 in FIG. 2) takes control of the frame and queues the frame in an outbound buffer of memory 15, to wait for the next available token on the multi-channel token ring. When the concentrator CPUs determine that a token on one of the channels is available, the frame is sent over the concentrator bus 19 to the token ring adapter corresponding to the available channel. For example, if the first available token is on channel 31, the frame will pass from the outbound buffers to the token ring adapter 16 (if a token for channel 31 was not available, a token for either channel 32 or channel 33 could be utilized, if available). At token ring adapter 16, the concentrator ring MAC (layer C5 in FIG. 2) in the adapter encapsulates the frame with a standard IEEE 802.5 header and trailer (see FIG. 5). The encapsulated frame is then transmitted. Consequently, as additional tokens for other channels may become available prior to a token on the same line becoming available, throughput speed for multi-frame messages can be speeded up substantially.

The information sent by the workstation 11 to the workstation 21 travels on channel 31 with its accompanying token until it reaches a token ring adapter in a concentrator that recognizes the destination address 'BBBB' of the frame (e.g., token ring adapter 26 in concentrator 22). Note that the recognized address is the same as that of workstation 21, which is connected to concentrator 22 via dedicated lobe ring 30. At adapter 26, the concentrator ring MAC (layer C5 in FIG. 2) performs error checking and removes the header and trailer. The frame is moved into an inbound buffer of memory 25 in the concentrator 22, at which time CPU 2B is notified that a frame has been received, and the cache memory of memory 25 is updated with the location of the frame. CPU 2B signals CPU 1B via the common bus 29 that the frame was received; in turn, CPU 1B obtains the frame location from the cache memory, and passes the frame to the CMS (layer C3 in FIG. 2) of concentrator 22.

Next, the frame proceeds to the concentrator lobe MAC (layer C2 in FIG. 2) in concentrator lobe adapter 24, where the frame is encapsulated with a standard IEEE 802.5 header and trailer (see FIG. 5). When a token is available on the dedicated lobe ring 30, the frame is sent to concentrator lobe adapter 23 at address 'BBBB' in workstation 21.

When the frame is received by adapter 23, the workstation MAC (layer W2 in FIG. 2) performs error checking, removes the header and trailer, and passes the frame to the SMS (layer W3 in FIG. 2). The SMS passes the frame to the LLC (layer W4 in FIG. 2), which in turn sends the information to the application (layer W5 in FIG. 2) running at workstation 21. Thus, information is sent from one workstation or device to another workstation or device on the same multi-channel token ring using the addressing scheme and components of the present invention. Because of this scheme, sequential data frames can be transmitted over multiple channels, which speeds up the data transfer as opposed to when the same channel is used, since it is not likely that a token will become available on the first-used channel until after tokens on the other channels have become available.

Figure 6:
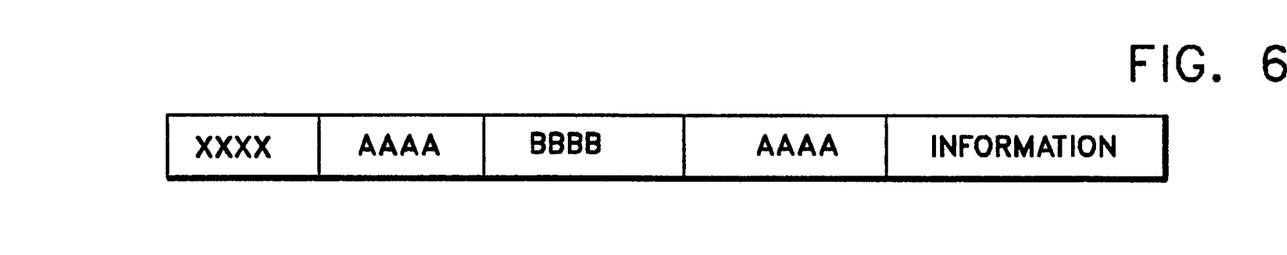
FIG. 6 is a representation of the fields of a token ring frame as used in an alternative embodiment of this invention.

A possible function of the SMS that is not included in the embodiment of the invention as described is an encapsulation procedure for transmitting frames from a workstation to a concentrator. This procedure could be used in place of the recognition by the concentrator lobe adapter that the source address of the frame is not that of the concentrator. In this alternative embodiment, the SMS (layer W3 in FIG. 2) appends additional source and destination address fields to the frame created by the LLC (layer W4 in FIG. 2), prior to sending the frame to the concentrator. As illustrated in FIG. 6, the source address 'AAAA' is the address of adapter 13 in the workstation 11, while the destination address 'XXXX' is that of adapter 14 in the concentrator 12. After the frame reaches the concentrator 12, the appended address information is removed by the CMS (layer C3 in FIG. 2) before the frame is queued in an outbound buffer.

Figure 7A:
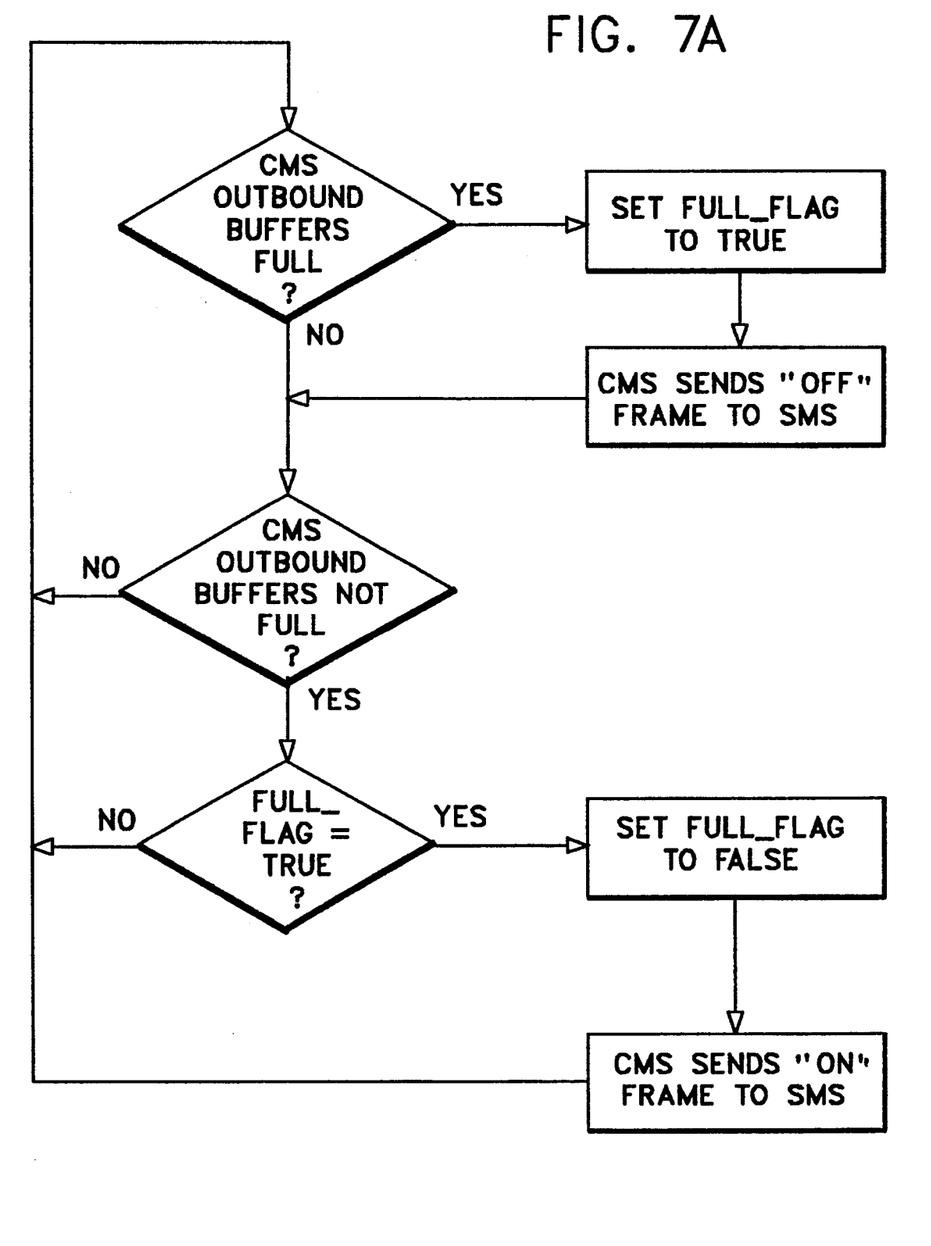
FIGS. 7A–7B, 8A–8B, 9, and 10A–10B are flowcharts detailing protocol and procedures implemented in the preferred embodiment of this invention during the transmission of information among a workstation, a concentrator, and a multi-channel token ring.
Figure 7B:
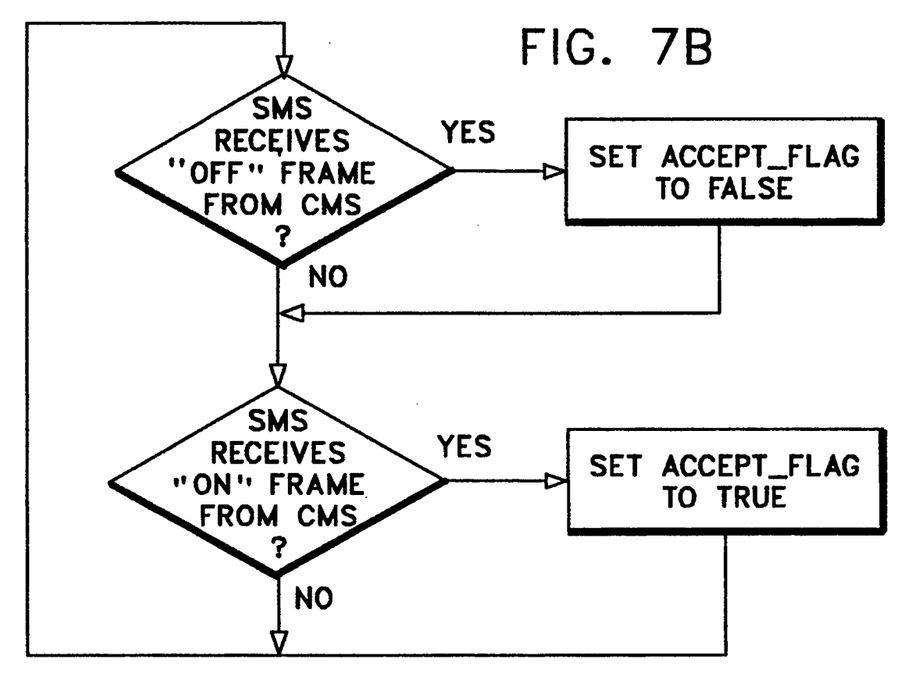

During the transmission and receipt of information, as described in this invention, several protocols and procedures are implemented. FIGS. 7A and 7B illustrate the protocol between the SMS (layer W3 in FIG. 2) in a workstation and the CMS (layer C3 in FIG. 2) in the associated concentrator, whereby the CMS notifies the SMS as to whether or not the outbound buffer in the concentrator is full; the SMS cannot send a data frame if the outbound buffer is full. A recovery procedure, not shown, would be implemented to recover from the possibility of deadlock if the notification from the CMS was not received correctly by the SMS.

Figure 8A:
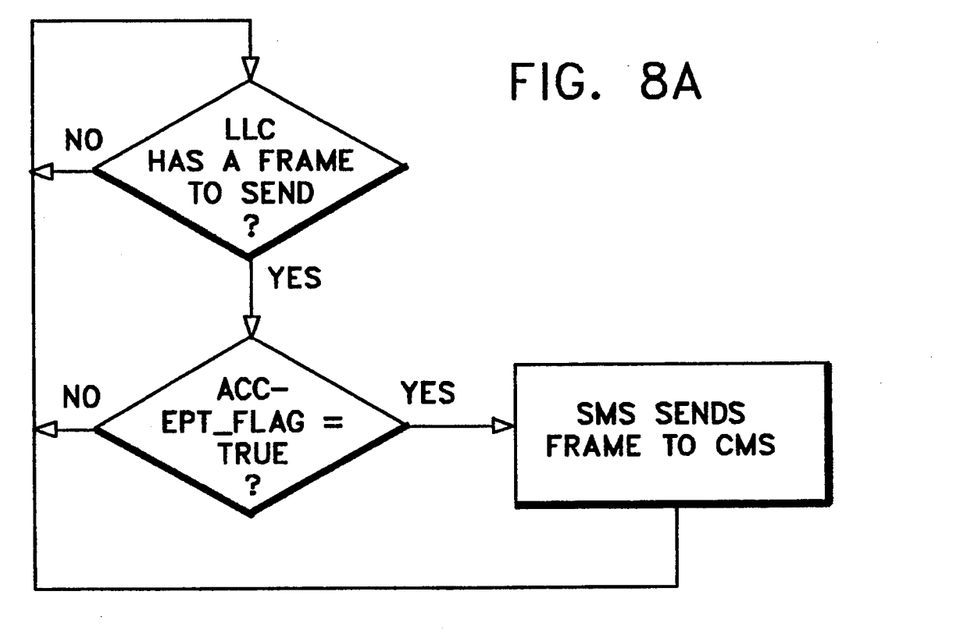
Figure 8B:
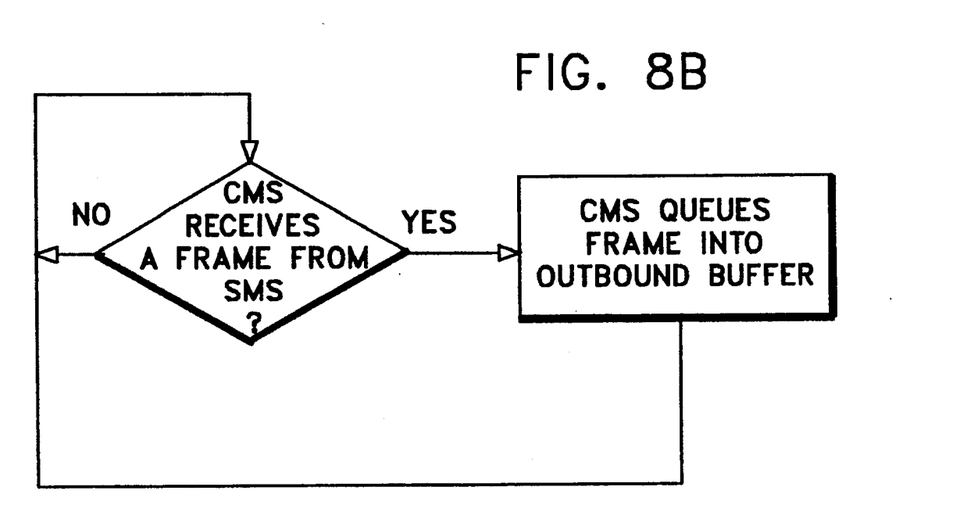
Figure 9:
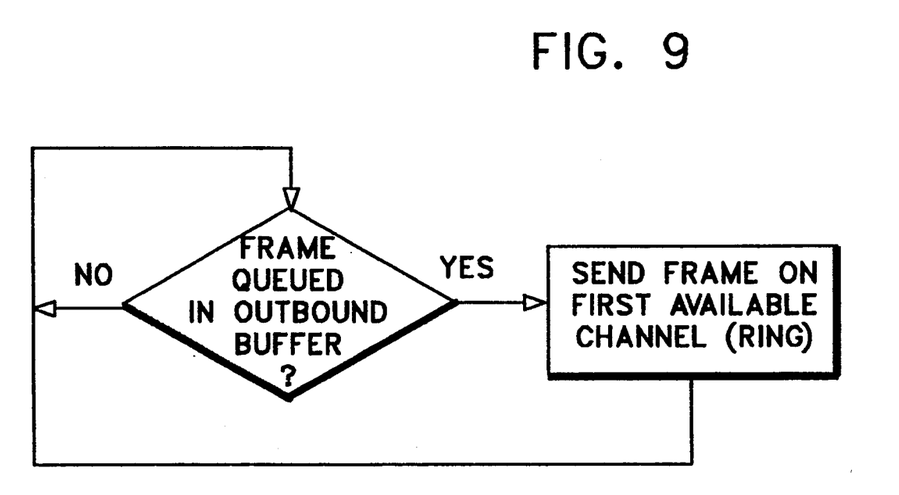
Figure 10A:
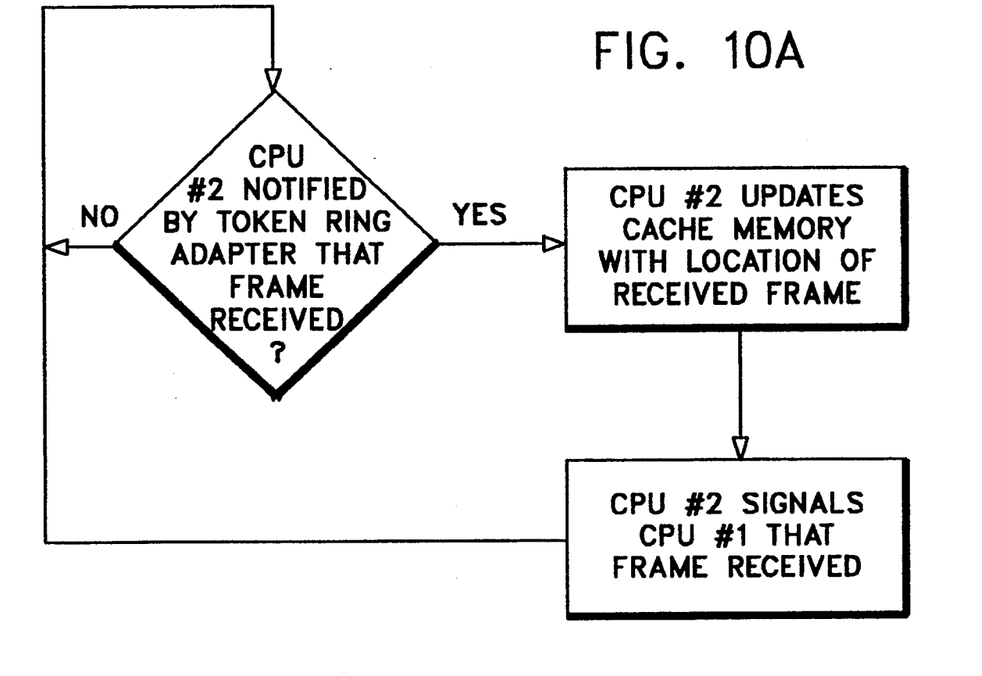
Figure 10B:
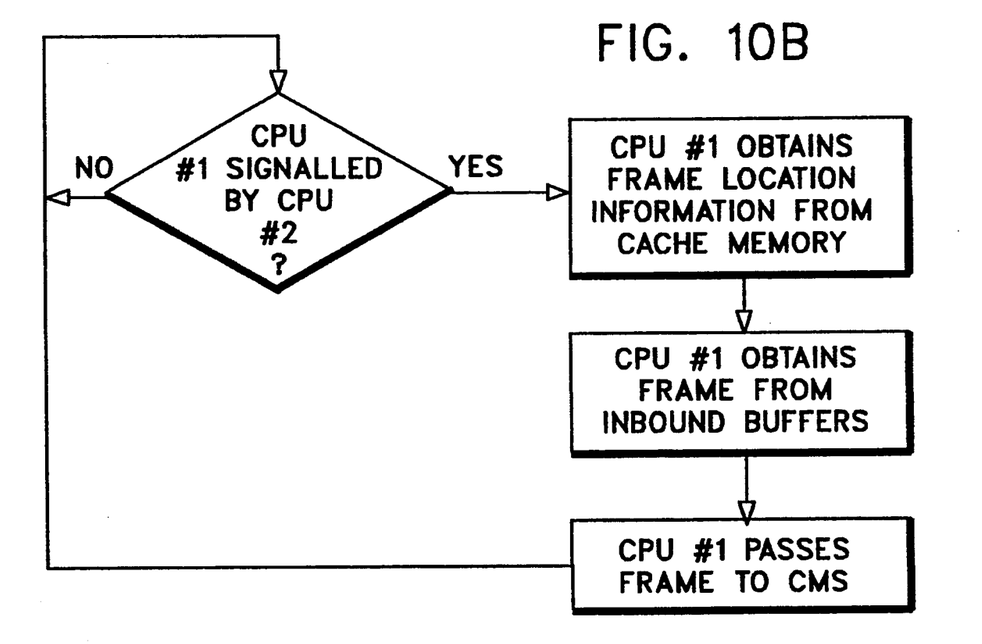

In FIG. 8A, the procedure is shown by which the SMS sends a data frame to the CMS; FIG. 8B shows receipt of that frame by the CMS, followed by queuing of the frame in a concentrator outbound buffer. FIG. 9 illustrates the next step in the transmission process, a 1-to-n interface, whereby a frame that is queued in an outbound buffer is sent on the first available channel. FIGS. 10A and 10B illustrate the n-to-1 interface by which a frame coming from the multi-channel token ring is received in the concentrator and manipulated by the CPUs for transmission to the workstation.

Figure 11A:
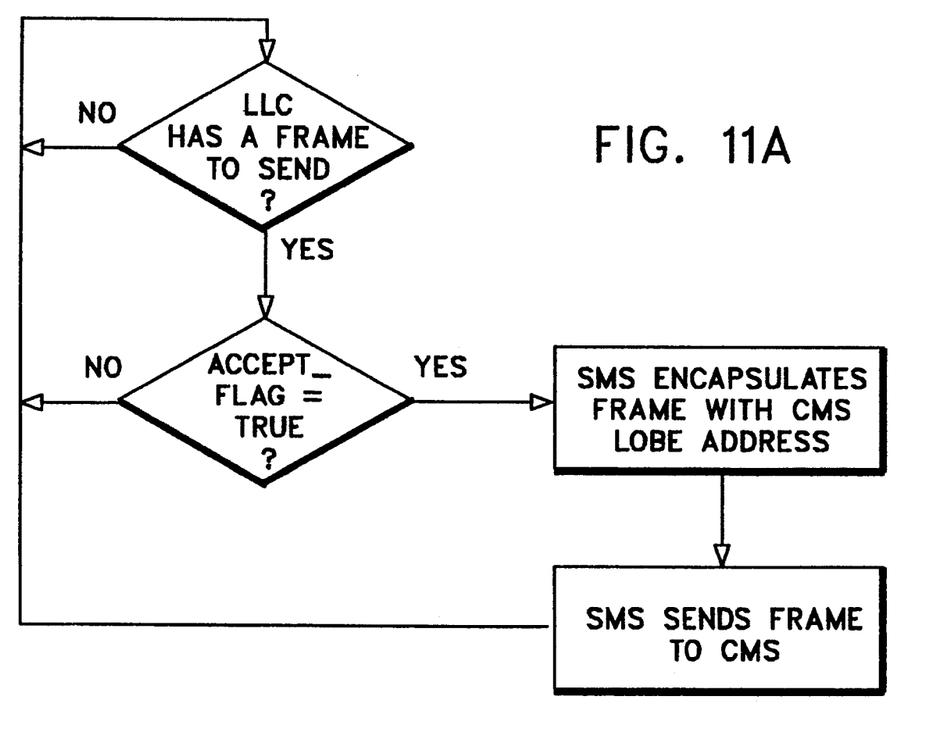
FIGS. 11A–11B are flowcharts of the encapsulation procedure relating to the alternative embodiment of this invention illustrated in FIG. 6.
Figure 11B:
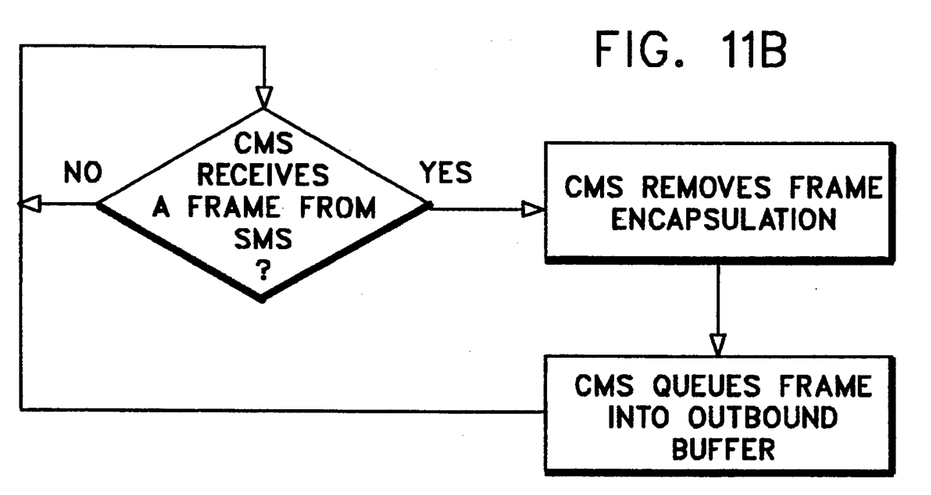

Finally, FIG. 11A illustrates the encapsulation procedure as used in the alternative embodiment of this invention, whereby the SMS encapsulates a data frame with the address of the concentrator lobe ring adapter and sends it to the CMS. FIG. 11B shows receipt of that frame by the CMS, followed by removal of the appended address, and queuing of the frame in a concentrator outbound buffer.

It should be noted that the layers and concentrator lobe discussed herein may be in the form of an adaptor which enables a workstation to communicate over a multi-channel transmission media.

While a preferred embodiment of the present invention has been described, variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is desired to be protected by Letters patent is:
1. A communications system comprising:
   a transmission media having multiple channels;
   a plurality of access units, each interfacing with each of the individual channels of said transmission media;
   at least one device associated with each of said access units, each said device interfacing with its associated access unit to receive data from and send data to said transmission media; and
   means for sending data between said at least one device and its associated access unit, said sending means including a dedicated communications channel for each said at least one device and its associated access unit;

wherein each said access unit determines which data, if any, being transmitted over the channels of said transmission media is intended for one of said device associated therewith, intercepts only the intended data, and sends the intercepted data to said associated device via said dedicated communications channel of said sending means, and wherein each said dedicated communications channel of said sending means comprises a lobe ring, each lobe ring providing communications between one of said access units and said at least one device associated with said one access unit, and wherein each of said access units includes:

at least one first physical interface, each first interface interfacing with and corresponding to each lobe ring associated with the access unit;

second physical interfaces, one corresponding to and interfacing with each channel of said transmission media with which means for controlling access to the first physical interfaces, receipt of data from and transmission of data to the channels of said transmission media and access to the second physical interfaces.

2. The communications system according to claim 1, wherein said transmission media comprises a token ring with multiple channels operating in parallel.

3. The communications system according to claim 1, wherein each said device includes means for transferring data to and from said associated access unit via the lobe ring associated with said device, the transferring means including a physical interface with the lobe ring; and means for controlling access to the physical interface of the transferring means, receipt of data from the lobe ring and transmission of data to the lobe ring, and receipt of data by the device and transmission of data from the device.

4. The communications system according to claim 1, wherein the controlling means of said transferring means communicates, via the lobe ring associated with said device, with the controlling means of its associated access unit to control transmission of data between said device and said access unit.

5. The communications system according to claim 1, wherein the controlling means of said access unit includes memory having means for storing control data and means for temporarily storing received data.

6. The communications system according to claim 5, wherein the controlling means of said access unit and the controlling means of said device cooperate so that if the storing means for data received from said device is full, the controlling means of said device will not send additional data to the controlling means of said access unit.

7. The communications system according to claim 1, wherein, upon receiving data frames from said associated devices, each said access unit determines which of the channels is or becomes available first and sends the data frames received from said associated devices over the first available channel of said transmission media.

8. The communications system according to claim 1, wherein each of the lobe rings operates to transfer data intercepted by its associated said access unit from said transmission media destined for any said access unit's associated said devices to said associated device and to transfer data from any one of said associated devices to said access unit for transmission over a first available one of the multiple channels.

9. The communications system according to claim 1, wherein each of said access units receives data intended for transmission over said transmission media from its associated said devices via said dedicated communications channel and sends the data over a first available one of the multiple channels.

* * * * *